United States Patent
Janssen

(10) Patent No.: US 6,919,917 B1
(45) Date of Patent: Jul. 19, 2005

(54) DEVICE FOR MONITORING THE ENVIRONMENT OF A VEHICLE BEING PARKED

(75) Inventor: Holger Janssen, Hessisch Oldendorf (DE)

(73) Assignee: Robert Bosch GmbH, Stuttgart (DE)

( * ) Notice: Subject to any disclaimer, the term of this patent is extended or adjusted under 35 U.S.C. 154(b) by 576 days.

(21) Appl. No.: 09/857,240

(22) PCT Filed: Sep. 28, 2000

(86) PCT No.: PCT/DE00/03418

§ 371 (c)(1),
(2), (4) Date: Aug. 29, 2001

(87) PCT Pub. No.: WO01/25054

PCT Pub. Date: Apr. 12, 2001

(30) Foreign Application Priority Data

Oct. 2, 1999 (DE) .......................... 199 47 766

(51) Int. Cl.$^7$ .............................. H04N 9/47; H04N 5/30
(52) U.S. Cl. ....................... 348/143; 348/162
(58) Field of Search .............................. 348/143, 148, 348/149, 156, 157, 159, 162; H04N 9/47, 5/30

(56) References Cited

U.S. PATENT DOCUMENTS

| 5,479,173 | A | | 12/1995 | Yoshioka |
| 5,646,614 | A | | 7/1997 | Abersfelder |
| 5,742,141 | A | * | 4/1998 | Czekaj ....................... 318/587 |
| 6,154,149 | A | * | 11/2000 | Tyckowski et al. ......... 340/903 |
| 6,326,915 | B1 | * | 12/2001 | Chen et al. .................... 342/71 |
| 6,424,273 | B1 | * | 7/2002 | Gutta et al. ................. 340/937 |
| 6,476,730 | B2 | * | 11/2002 | Kakinami et al. ....... 340/932.2 |

FOREIGN PATENT DOCUMENTS

| DE | 43 36 288 | 3/1995 |
| DE | 198 01 884 | 7/1999 |

* cited by examiner

Primary Examiner—Nhon Diep
(74) Attorney, Agent, or Firm—Kenyon & Kenyon

(57) ABSTRACT

A device for monitoring the environment of a vehicle being parked, which is used for reliably detecting objects in the way, and which makes it possible to calculate parking maneuvers. The device includes at least one video camera having laterally arranged object-detection sensors, which cover areas that are not recorded by the video camera. In this manner, the driver can be supplied in a simple manner with warnings, even though a putative obstacle is not detectable in the video image.

11 Claims, 3 Drawing Sheets

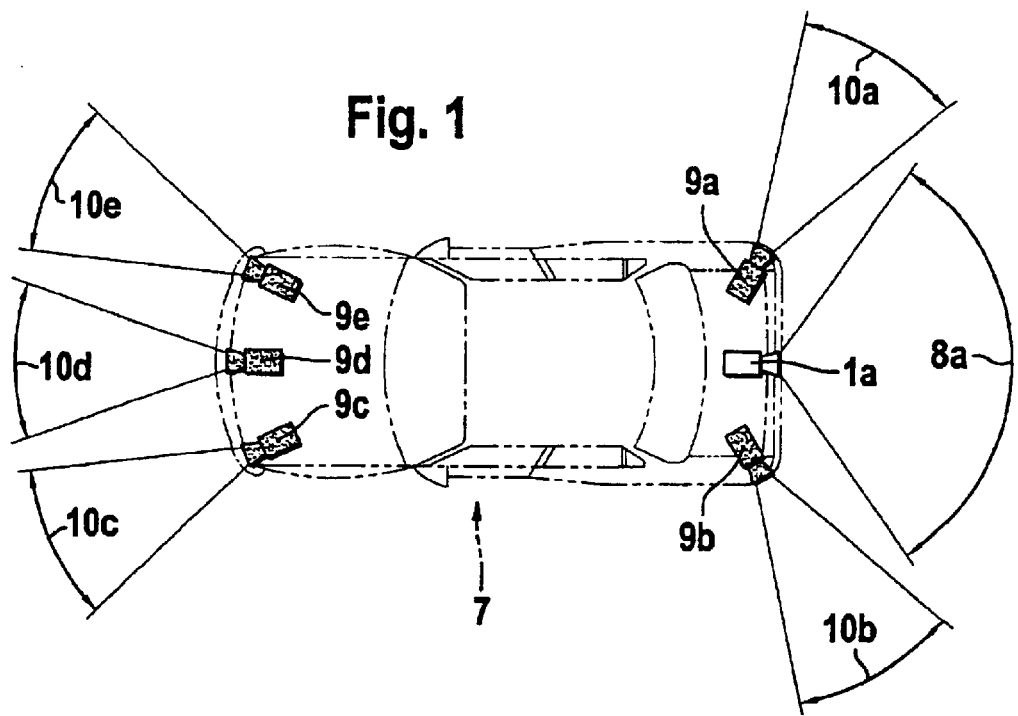
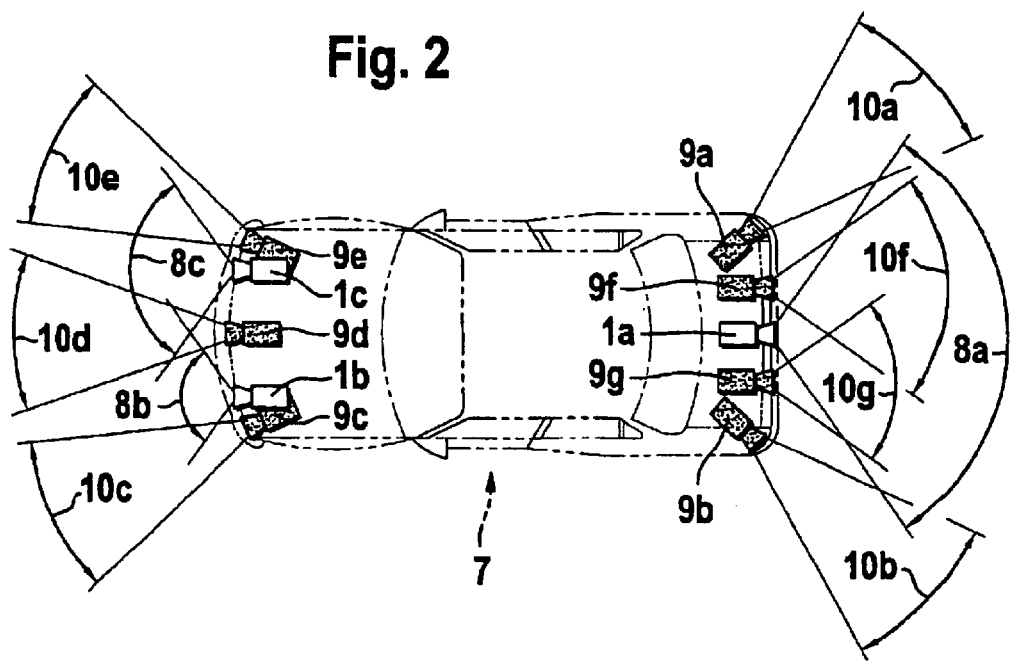

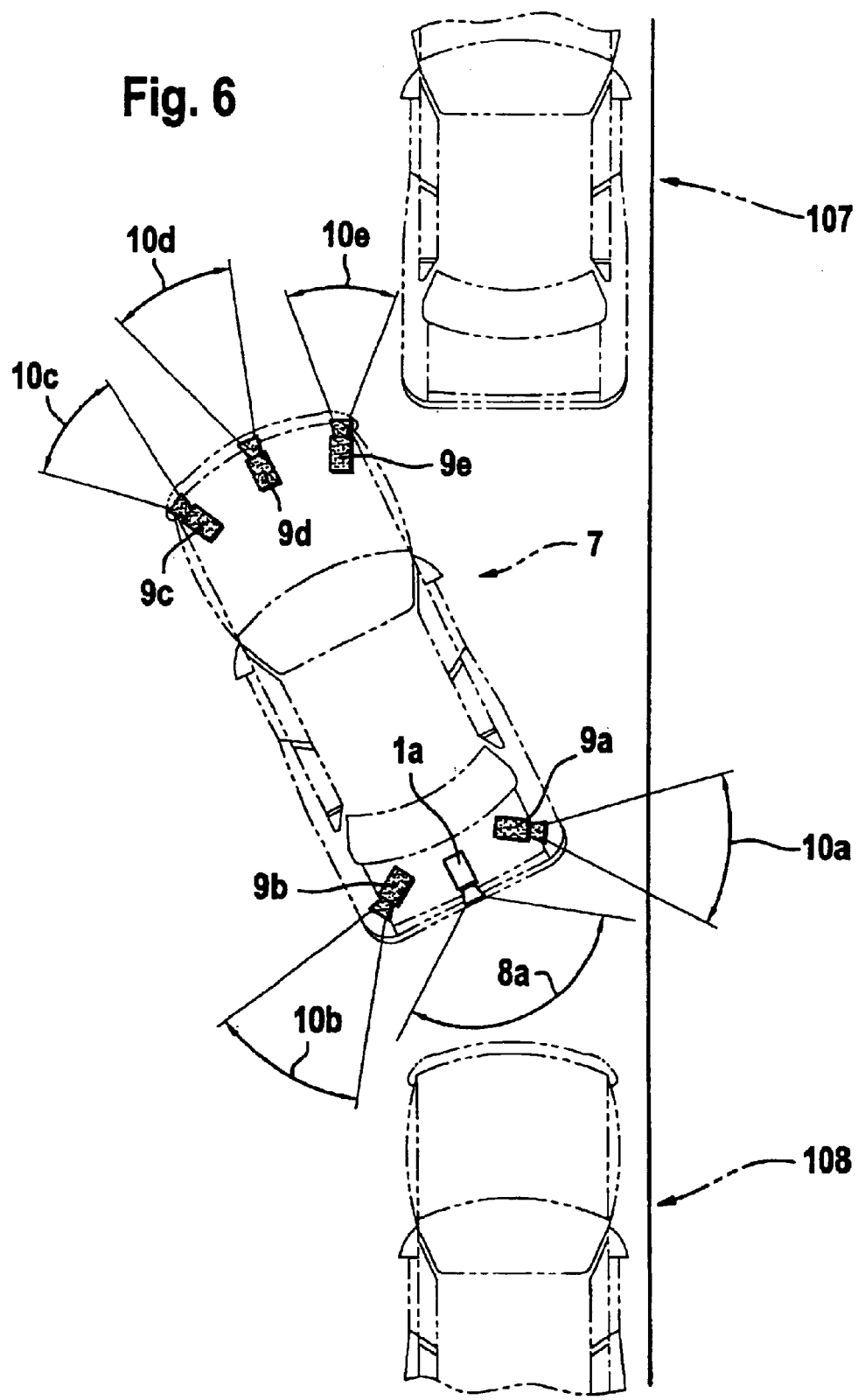

DEVICE FOR MONITORING THE ENVIRONMENT OF A VEHICLE BEING PARKED

FIELD OF THE INVENTION

The present invention relates to a device for monitoring the environment of a vehicle being parked.

BACKGROUND INFORMATION

A conventional device for monitoring the environment of a vehicle being parked is described in German Patent No. 43 36 288. In the device described, means are provided for swiveling a camera to expand the vision field of the camera.

SUMMARY OF THE INVENTION

In contrast, the device according to the present invention has the advantage that on the basis of a simple, robust arrangement, reliable monitoring of the vehicle environment can be assured. Movable parts that are subject to wear are avoided, and the dead angles of the video camera are included in the monitoring area. This allows the driver to receive a danger message in response to, for example, persons situated in the dead angle of the camera, and not only when questionable obstacles are located in the vision field of the camera. Therefore, there is an economic distribution of functions in detecting objects and reporting to the driver between the object-detection sensors on the one hand, and the camera on the other.

It is advantageous that the existence of objects outside of the vision field of the camera can be represented separately via a display unit. As a result, the attention of the driver is immediately guided in the direction in which the danger threatens, although he is still unable to detect anything through the video image.

It is particularly advantageous to provide an object-detection unit which, for evaluating objects, processes both data from the object-detection sensors as well as the video images. Combining a plurality of sensor information units in an overall display has the advantage that the behavior of the system is always transparent because the driver can also check the information visually. The driver is not limited to the few parameters that isolated object-detection sensors would supply, such as the vehicle distance to the person behind. As a result, it is possible at any time for the driver, in a simple fashion, to carry out monitoring and driving correction.

The visual presentation of the results in the image of the recording video camera has the advantage that the driver can very effectively survey the situation, since he is accustomed to steer the vehicle based on visual information.

BRIEF DESCRIPTION OF THE DRAWINGS

FIG. 1 depicts a top view of a vehicle having a monitoring device according to an embodiment of the present invention.

FIG. 2 depicts a vehicle having a further device according to an embodiment of the present invention.

FIG. 6 depicts an exemplary parking scenario.

DETAILED DESCRIPTION

Figure 3:
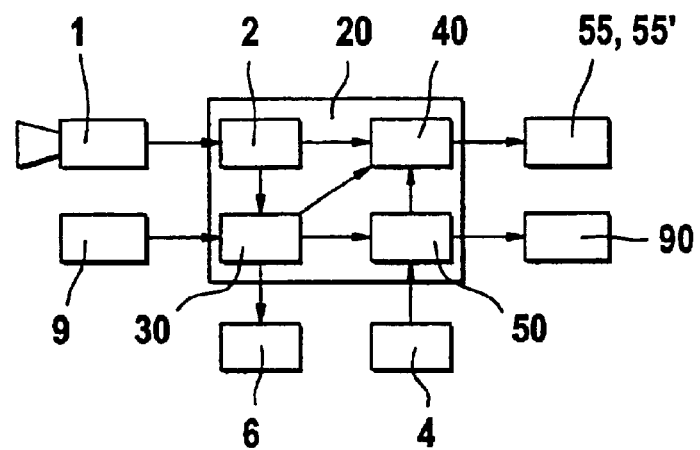
FIG. 3 depicts a schematic representation of a further device according to an embodiment of the present invention.

FIG. 1 depicts a top view of a vehicle 7. In the rear space of vehicle 7, a video camera 1a disposed which monitors the rear area of the vehicle in a vision field 8a. Mounted adjacent to video camera 1a are object-detection sensors 9a and 9b, which are used to detect objects in environment sectors 10a and 10b, respectively. These environment sensors 10a and 10b directly adjoin vision field 8a, but lie outside of it. In addition, forward-directed object-detection sensors 9c, 9d, and 9e are arranged in the area of the front bumpers of the motor vehicle, the sensors monitoring environment sectors 10c, 10d, and 10e, which are directed toward the front area.

Video camera 1a, non-movable and fixedly installed at minimal expense, covers a prescribed vision field 8a which can be displayed to the driver by a video display unit arranged, for example, in the dashboard or the center console of the vehicle. Using object-detection sensors 9a and 9b, it is possible to detect objects that are approaching the area monitored by the camera but that are not yet registered in the image. Detected objects of this kind can then be reported to the driver even though they cannot yet be detected in the camera image. The object can be, for example, a child that is approaching the vehicle from the side, although the driver cannot see this child either in the displayed image of the camera or in the rear view mirrors, because the child is located in the dead angle. The object-detection sensors are configured, for example, as ultrasound, radar, video, or lidar sensors. Additional sensors 9c, 9d, and 9e can be used during parking maneuvers for measuring at all times the distance to the vehicle parked ahead or for detecting other (endangered) objects. If the distance to the forward vehicle or another object is too small, a message can be transmitted.

The additional sensors can also be installed at any location in the vehicle to monitor the corresponding environment. For example, the time-related vehicle area offers further installation possibilities, in which objects can be observed and appropriate warnings can be provided to the driver. If the object detection is carried out in a monocular fashion, economies can be achieved because only one camera is used. However, such methods have the disadvantage, in comparison to stereo methods, that they do not deliver very precise and dependable results. By combining monocular object detection with other sensors such as ultrasound sensors, precision and reliability can be significantly increased.

FIG. 2 depicts vehicle 7, which has additionally installed video cameras 1b and 1c, whose corresponding vision fields 8b and 8c cover the front area of the vehicle. In this context, the cameras are mounted between object-detection sensors 9c, 9d, and 9e, so that the three aforementioned object-detection sensors, as a supplement to the cameras, monitor the peripheral areas of vision fields 8b and 8c. Furthermore, other object-detection sensors 9f and 9g are mounted in the rear part of the vehicle which have corresponding environment sectors 10f and 10g that partially overlap vision field 8a of the video camera 1a, bringing these areas of vision field 8a into the monitoring area in supplement to the video camera.

Providing additional object-detection sensors in the rear part of the vehicle results in increasing the reliability of object detection by generating data redundancy. If vehicle 7 is operated using a trailer, then, in the event that the trailer obscures the vision field or the environment sectors of the rear camera or of the rear object-detection sensors, the trailer can be provided with an analogous monitoring device 1a, 9a, 9b, 9f, 9g, which is directed at the area behind the trailer. Thus, vehicles in trailer operation can also support the driver during parking maneuvers.

FIG. 3 depicts the schematic design of a device for monitoring the environment of a vehicle being parked, in which the totality of the video cameras is designated by reference numeral 1 and the totality of the object-detection sensors is designated by reference numeral 9. The video cameras and the object-detection sensors are connected to a control unit 20. Control unit 20 has an image processing unit 2, which processes the image data of video cameras 1. Image processing unit 2 delivers preprocessed image data to an object-detection unit 30, which processes both the preprocessed image data of the video cameras as well as the signals of object-detection sensors 9. Detected objects or danger situations can be reported to the driver via an acoustical display 6. The acoustical display is arranged in the passenger area of the vehicle. A superimposition unit 40 is connected to image processing unit 2 and to object-detection unit 30. This superimposition unit 40 superimposes information supplied by object-detection unit 30 with respect to detected objects and the pre-processed image data from image processing unit 2 for representation in a video display unit 55 or 55'. Object-detection unit 30 is also connected to a maneuver calculating unit 50, which, from the object data of object-detection unit 30 and externally supplied parameters 4, for example the selected steering wheel angle, calculates driving maneuvers and transmits this data to superimposition unit 40 for visual representation in the video display unit. Maneuver calculating unit 50 is also connected to a control unit 90 for the purpose of independently carrying out a driving maneuver.

In control unit 20, the images of the video cameras can be pre-processed using image processing algorithms, and they can be displayed on a video display unit 55 or 55'. In this context, the algorithms of the control unit can also use vehicle parameters such as speed and the steering angle of the steering wheel. In the video display unit, in addition to the image content of the cameras, supplemental information such as warnings about objects in the vehicle environment can also be displayed. The possibility also exists of generating warnings acoustically via acoustical display 6. In this context, image processing unit 2 includes algorithms for image preprocessing, such as noise suppression, image rectification, or the like. The processed images may be combined with supplemental image contents using superimposition unit 40 and would be displayed on the video display unit. Object-detection unit 30 receives data from the object-detection sensors and from the image processing unit. Detected objects are transmitted to superimposition unit 40 for display in the video display unit and are also relayed to maneuver calculating unit 50 for calculating maneuvers. In order to calculate maneuvers, external parameters can be taken into consideration. The maneuver calculating unit can prepare the calculated maneuvers suitably for representation in the video display unit and, if appropriate, it can intervene in the control of the vehicle through a control unit 90. Exemplary actuator systems include systems for influencing the steering angle and intervening in the engine and brake control systems. Object-detection unit 30, in monitoring in the environment, does not initially presuppose a preestablished parking geometry or the like, but rather, on the basis of the actually existing image or object-detection data, generates a description of the environment. The modeling of the environment and the images of the cameras are thus combined into one representation by superimposition unit 40. This representation is used to inform the driver comprehensively about the current situation in the vehicle environment. In this context, the object detection system supplies the location and the number of objects and, depending on the sensor system used, it can supply varying object sizes in varying degrees of precision. This data (size and distance of the objects) can also be displayed in the video display unit, by object-detection unit 30 also transmitting this data to superimposition unit 40 in the appropriate manner. Using maneuver calculating unit 50, the device according to the present invention, in addition to passively monitoring the momentary situation in the vehicle environment, can also actively assist the driver in controlling the vehicle. Object-detection unit 30 transmits to maneuver calculating unit 50 the modeling data or the object-detection data of the environment. For certain scenarios, the vehicle course is then calculated by maneuver calculating unit 50. In what follows, a few advantageous possibilities are indicated:

1. The vehicle course yields to detected obstacles.
2. The vehicle course leads into a parking space parallel to the roadway.
3. The vehicle course leads into a parking space perpendicular to the roadway.
4. The vehicle course leads into a parking space diagonal to the roadway.
5. The vehicle course leads to a predetermined setpoint position between a plurality of obstacles, it being possible, e.g., to configure the latter. Thus, an example of a setpoint position is the position in the home garage, and an example of an obstacle is the gate in front of this garage. For calculating the above-mentioned vehicle courses, it can also be taken into account that a trailer is attached to a vehicle and that the driver should initially countersteer in order to arrive at a predetermined setpoint position. Either the maneuver calculating unit is configured so that it automatically detects the above-mentioned different situations, or the driver has the possibility of selecting the corresponding parking variant in the selection means installed in the dashboard. Certain maneuvers, such as parking in the home garage or other standard maneuvers, can also be stored in the memory or be preprogrammed. For this purpose, the maneuver calculating unit has a suitable program memory, from which the stored maneuvers can be retrieved.

From the above-mentioned considerations, according to an embodiment of the present invention, the following gradations for the degree of vehicle intervention are provided:

1. The images of the video cameras are displayed in the video display unit mounted in the dashboard or in the center console.
2. At the same time, object information, such as size, position, and distance, are overlaid in the appropriate manner.
3. Additionally, information regarding the vehicle condition is overlaid, such as the steering angle adopted, which determines the appropriate driving path, the vision angle of the vehicle with respect to the road (i.e., the angle of the normal through the automobile relative to the road normal), etc.
4. The steering maneuvers are calculated by maneuver calculating unit 50 and are displayed in the video display unit. The steering angle is calculated by the system as a function of the current situation and is overlaid on the camera image in addition to the current vehicle steering angle. On the basis of the overlaid steering angle, the driver makes a variance comparison and turns the steering wheel accordingly. In this manner, the driver continually maintains complete control. The necessary steering direction can also (additionally) be indicated by correspondingly overlaid arrows.

5. The device automatically sets the calculated steering angle via control unit 90, so that there is a direct intervention in the steering. However, the steering angle can at any time be overridden by the driver, and thus an individually appropriate steering angle can be chosen. The driver himself thereafter controls the vehicle longitudinal motion, i.e., the engine and brakes.

6. In a completely automatic operating mode, the device controls the vehicle entirely automatically by intervening both in the steering as well as in the engine control on the basis of the calculated vehicle maneuvering data. Here too, the maneuver can at any time be broken off by the driver.

In an alternative embodiment, Object-detection unit 30 and maneuver calculating unit 50 can be configured so that the active maneuver control is automatically broken off in accordance with Point 6, for example, in the following situations:

1. Objects, especially rapidly moving objects, appear in the driving area, especially in the rear vehicle area.

2. Objects were surveyed in a grossly mistaken fashion.

3. There exists an acute danger of collision with an object.

4. Endangered objects (e.g., living things) appear.

Figure 4:
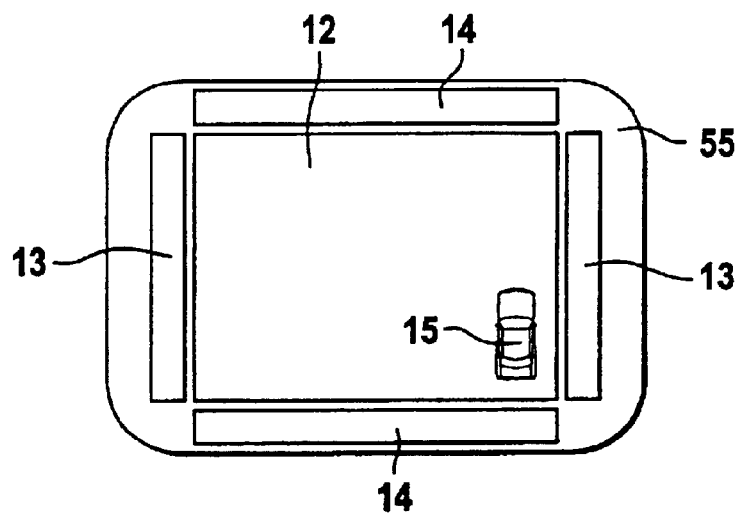
FIG. 4 depicts a video display unit according to an embodiment of the present invention.

FIG. 4 depicts an embodiment 55 of the video display unit for displaying the images supplied by the cameras and processed by the control unit. Video display unit 55 has an image area 12 as well as both vertical edge areas 13 as well as horizontal edge areas 14, which together form the border of image area 12.

In image area 12 itself, and in the vertical as well as the horizontal edge areas of the image area, colored bars are displayed for optically signaling objects in the vehicle environment that are not covered by the vision field of video camera(s). Additionally, at a suitable location, a pictogram 15 can be overlaid for representing the vehicle itself. In the environment of this vehicle, the position of detected objects can also be plotted. Video display unit 55 can advantageously be integrated in the dashboard or in the center console of the vehicle.

As the warning color, a signal color such as red can be used in the edge areas. Depending on which bar lights up, the driver knows immediately to which side of the vehicle he should direct his attention although the camera image still is not supplying any information to him. Additional parallel support can be provided by acoustical display 6.

Figure 5:
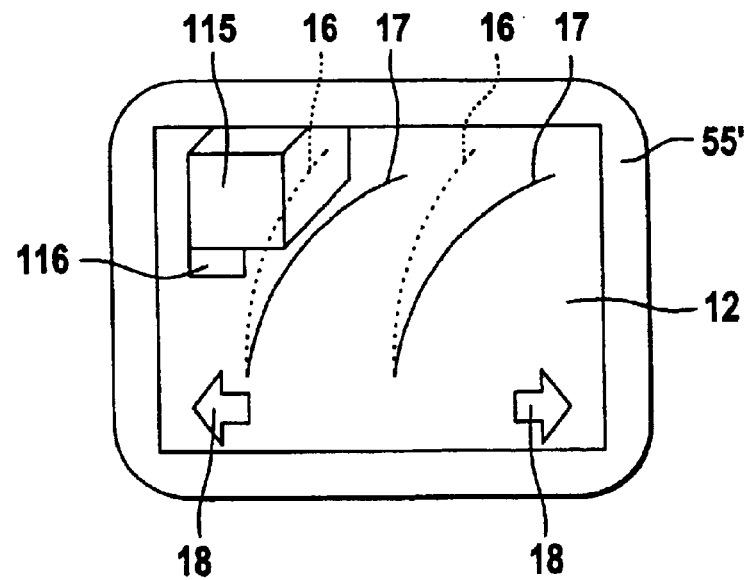
FIG. 5 depicts a further video display unit according to an embodiment of the present invention.

FIG. 5 depicts a further embodiment 5' of the video display unit. In image area 12, a cube 115 is depicted, which in its size and shape roughly represents a detected object. In area 116, data can be overlaid for the distance or the size of this object. Lines 16 mark the driving path of the vehicle, if the given steering angle were to be maintained. Lines 17 mark the driving path which the vehicle would cover if the driver were to follow the calculated route. Arrows 18, which light up, alternatively, depending on the direction in which the driver is supposed to turn the steering wheel, show him how he should steer in order to achieve the steering angle suggestion that is indicated by lines 17.

All of the cited information is superimposed in image area 12 along with the image of the video camera in order to provide rapid and precise information to the driver concerning the situation. When the vehicle guidance is performed manually, it is also possible, if sensors and cameras are also present in the forward vehicle area, to provide an automatic switchover between the front and the rear video camera depending on which gear the driver has currently selected.

FIG. 6, by way of example, shows a parking maneuver of vehicle 7 behind parked vehicle 107 and in front of parked vehicle 108. The same reference numerals as in the previous Figures designate the same corresponding parts.

In particular, laterally arranged object-detection sensors 9*a* and 9*b* monitor areas that cannot be observed by fixedly-installed camera 8*a*, but which are relevant for parking, particularly if careless pedestrians, for example, enter into the areas just outside vision field 8*a* of camera 1*a*. In this case, the driver receives through the video display unit an appropriate warning and can act accordingly until these pedestrians once again move out of the dead angle of the vehicle. Front object-detection sensors 9*c*, 9*d*, and 9*e* also supply the precise distance to forward vehicle 107 and make parking easier for the driver especially when vehicle chassis are not completely visible, making the borders of the vehicle hard to determine from the driver's seat.

What is claimed is:

1. A device for monitoring the environment of a vehicle being parked, comprising:

at least one video camera, the at least one camera having a vision field the vision field being fixed relative to the vehicle;

at least one display unit, one of the at least one display unit being a video display unit for representing the vision field; and at least one object-detection sensor for detecting objects in an area outside of and directly adjacent to the vision field;

wherein a driver of the vehicle is informed via the at least one display unit of an existence of the objects located outside of the vision field of the at least one video camera detected by the at least one object-detection sensor.

2. The device as recited in claim 1, wherein the existence of the objects outside of the vision field are represented in edge areas of the video display unit.

3. The device as recited in claim 1, further comprising:

an object-detection unit; and an image processing unit;

wherein the at least one object-detection sensor is coupled to the object-detection unit, the object-detection unit being coupled to the image processing unit for selected digital image processing of video images from the at least one video camera, objects in the vision field of the at least one video camera being automatically detected and communicated to the driver.

4. The device as recited in claim 3, further comprising:

a downstream superimposition unit;

wherein objects detected by the object-detection unit are modeled using simple geometric forms, and the geometric forms are superimposed on a video image using the downstream superimposition unit.

5. The device as recited in claim 1, further comprising:

a maneuver calculating unit, the maneuver calculating unit processing external parameters including an instantaneous steering angle;

wherein an actual-steering-angle display can be carried out in the video display unit by applying calculations made in the maneuver calculating unit.

6. The device as recited in claim 5, the object-detection unit supplies the maneuver calculating unit with data concerning detected objects and the maneuver calculating unit calculates a parking maneuver on the basis of the supplied data.

7. The device as recited in claim 6, wherein the parking maneuver is represented in the video display unit in the form of a steering angle suggestion.

8. The device as recited in claim 6, further comprising:
a control unit, the control unit being coupled to the maneuver calculating unit, the control unit automatically executing the parking maneuver.

9. The device as recited in claim 8, wherein the maneuver calculating unit includes a storage unit for storing standard parking maneuvers including parking in a private garage, a standard parking maneuver being accessible for automatically executing the parking maneuver when the corresponding environment is detected by the object-detection unit.

10. The device as recited in claim 1, wherein the at least one object-detection sensor is one of an ultrasound sensor, a radar sensor, and a lidar sensor.

11. The device as recited in claim 3, wherein distances to detected objects are calculated using the object-detection unit, numerical values of the distances being overlaid in the video display unit.

* * * * *